(12) United States Patent
Di et al.

(10) Patent No.: US 9,928,070 B2
(45) Date of Patent: Mar. 27, 2018

(54) MICROPROCESSOR WITH A RESERVATION STATIONS STRUCTURE INCLUDING PRIMARY AND SECONDARY RESERVATION STATIONS AND A BYPASS SYSTEM

(71) Applicant: VIA ALLIANCE SEMICONDUCTOR CO., LTD., Shanghai (CN)

(72) Inventors: Qianli Di, Beijing (CN); Xiaoyuan Yu, Beijing (CN)

(73) Assignee: VIA ALLIANCE SEMICONDUCTOR CO., LTD, Shanghai (CN)

( * ) Notice: Subject to any disclaimer, the term of this patent is extended or adjusted under 35 U.S.C. 154(b) by 167 days.

(21) Appl. No.: 14/882,673

(22) Filed: Oct. 14, 2015

(65) Prior Publication Data

US 2017/0090934 A1    Mar. 30, 2017

(30) Foreign Application Priority Data

Sep. 25, 2015  (CN) .......................... 2015 1 0624996

(51) Int. Cl.
*G06F 9/38* (2018.01)
*G06F 9/30* (2018.01)

(52) U.S. Cl.
CPC .......... *G06F 9/384* (2013.01); *G06F 9/30032* (2013.01); *G06F 9/3836* (2013.01); *G06F 9/3838* (2013.01)

(58) Field of Classification Search
CPC .............................. G06F 9/3836; G06F 9/3838
See application file for complete search history.

(56) References Cited

U.S. PATENT DOCUMENTS 5,649,138 A * 7/1997 Ireton .................. G06F 9/3836
                                                                 712/217
6,253,287 B1 * 6/2001 Green ................. G06F 9/30152
                                                                 711/118
6,697,939 B1 * 2/2004 Kahle ................. G06F 9/30174
                                                                 712/240

(Continued)

FOREIGN PATENT DOCUMENTS

CN        1940861 A       4/2007
WO    WO2012106717 A1    9/2012

*Primary Examiner* — Jacob A Petranek
(74) *Attorney, Agent, or Firm* — McClure, Qualey & Rodack, LLP (57) ABSTRACT

A microprocessor with a fused reservation stations (RS) structure including a primary RS, a secondary RS, and a bypass system. The primary RS has an input for receiving issued instructions, has a push output for pushing the issued instructions to the secondary RS, and has at least one bypass output for dispatching issued instructions that are ready for dispatch. The secondary RS has an input coupled to the push output of the primary RS and has at least one dispatch output. The bypass system selects between the bypass output of the primary RS and at least one dispatch output of the secondary RS for dispatching selected issued instructions. The primary and secondary RS may each be selected from different RS structure types. A unify RS provides a suitable primary RS, and the secondary RS may include multiple queues. The bypass output enables direct dispatch from the primary RS.

21 Claims, 7 Drawing Sheets

(56) References Cited

U.S. PATENT DOCUMENTS

| | | | |
|---|---|---|---|
| 2003/0014613 A1* | 1/2003 | Soni | G06F 8/445 |
| | | | 712/217 |
| 2007/0198812 A1* | 8/2007 | Abernathy | G06F 9/3836 |
| | | | 712/214 |
| 2012/0204004 A1* | 8/2012 | Dockser | G06F 9/3814 |
| | | | 712/205 |
| 2013/0173886 A1 | 7/2013 | Dockser et al. | |
| 2013/0339679 A1 | 12/2013 | Iyer et al. | |
| 2015/0106595 A1* | 4/2015 | Khot | G06F 9/3836 |
| | | | 712/215 |

* cited by examiner

MICROPROCESSOR WITH A RESERVATION STATIONS STRUCTURE INCLUDING PRIMARY AND SECONDARY RESERVATION STATIONS AND A BYPASS SYSTEM

BACKGROUND OF THE INVENTION

Field of the Invention

The present invention relates in general to the process of issuing and dispatching instructions in a microprocessor, and more particularly to a fused reservation stations module that dispatches instructions for execution by the microprocessor more efficiently and with improved performance.

Description of the Related Art

Many modern microprocessors are superscalar in which they include multiple execution units and are capable of dispatching multiple instructions to the execution units in a single clock cycle. Many modern microprocessors also perform out-of-order (O-O-O) execution. That is, the microprocessor may execute instructions out of the order specified by the instructions of the software program. Superscalar out-of-order execution microprocessors typically attempt to maintain a relatively large pool of outstanding instructions so that they can take advantage of a larger amount of instruction parallelism.

A microprocessor executes the instructions of a corresponding instruction set architecture, such as the x86 instruction set architecture or the like. In many such microprocessors, the instructions of the instruction set architecture, often referred to as macroinstructions, are first translated into microinstructions (or micro-operations or "µops") that are issued to a reservation stations module, which in turn dispatches the instructions to the execution units. The microinstructions are more generally referred to herein simply as the instructions. The instructions are also issued to a reorder buffer (ROB) which ensures in-order retirement of the instructions.

The reservation stations (RS) include one or more ordered queues. When there are multiple instructions that are ready for dispatch from an RS queue, meaning that the instructions have met the conditions for being dispatched to an execution unit, then one or more of the ready instructions are dispatched to corresponding execution units. An instruction is ready for dispatch when an execution unit is available and when any operands necessary for instruction execution are also available. The efficiency and performance of the RS both need to improve as microprocessor design becomes increasingly more complex. It is desired to improve the timing and throughput of the RS by making it smaller and more efficient. The RS should also provide greater entry efficiency and increased execution unit support. Conventional RS configurations do not meet all of these design improvement goals.

SUMMARY OF THE INVENTION

A microprocessor with a fused reservation stations (RS) structure according to one embodiment includes a primary RS, a secondary RS, and a bypass system. The primary RS has an input for receiving issued instructions, has a push output for pushing the issued instructions to a secondary RS, and has at least one bypass output for dispatching at least one of the issued instructions that is ready for dispatch. The secondary RS has an input coupled to the push output of the primary RS and has at least one dispatch output. The bypass system selects between the bypass output of the primary RS and at least one dispatch output of the secondary RS for dispatching selected issued instructions.

The primary RS may be implemented with a unify RS structure. The secondary RS may be implemented with any type of RS structure, and typically includes multiple RS queues. The primary RS may operate as a spill buffer for receiving and storing additional issued instructions when the secondary RS is full. Also, the bypass system may allow the primary RS to directly dispatch instructions under certain conditions, such as when the secondary RS is not dispatching an instruction of a certain type in a given cycle. The primary RS may include a shift buffer that shifts instructions stored within to maintain received instruction order.

A microprocessor with a multiple stage reservation stations (RS) structure according to one embodiment includes a primary RS, a secondary RS, and a bypass control system. The primary RS includes at least one primary RS queue for storing received issued instructions, a push output for pushing issued instructions stored within to the secondary RS, and at least one bypass output that can dispatch at least one of the issued instructions stored in the primary RS queue that is ready to be dispatched. The secondary RS includes at least one secondary RS queue for storing issued instructions received from the primary RS, and at least one dispatch output for dispatching up to at least one of the issued instructions stored in secondary RS that is ready to be dispatched. The bypass control system selects between the dispatch output of the secondary RS and the bypass output of the primary RS for dispatching issued instructions.

BRIEF DESCRIPTION OF THE DRAWINGS

The benefits, features, and advantages of the present invention will become better understood with regard to the following description, and accompanying drawings where.

DETAILED DESCRIPTION

The inventors have recognized the inefficiencies and lower performance associated with conventional reservation stations structures. They therefore developed a fused reservation stations structure with improved efficiency and performance. The fused reservation stations (RS) structure includes a multiple stage or stacked reservation stations structure including a primary RS and a secondary RS. The primary RS provides a front-end spill buffer function for buffering issued instructions to reduce the incidence of transitioning to a reissue mode that delays the pipeline of the microprocessor. The fused structure can reduce front end timing bubbles because of the improved buffering function. Overall timing may be improved because both the primary and secondary RS structures may be made smaller. Furthermore, when the secondary RS is unable to dispatch at least one instruction of a given type, it may be bypassed when any one or more instructions within the primary RS are ready to be dispatched directly to the execution units of the processor.

Figure 1:
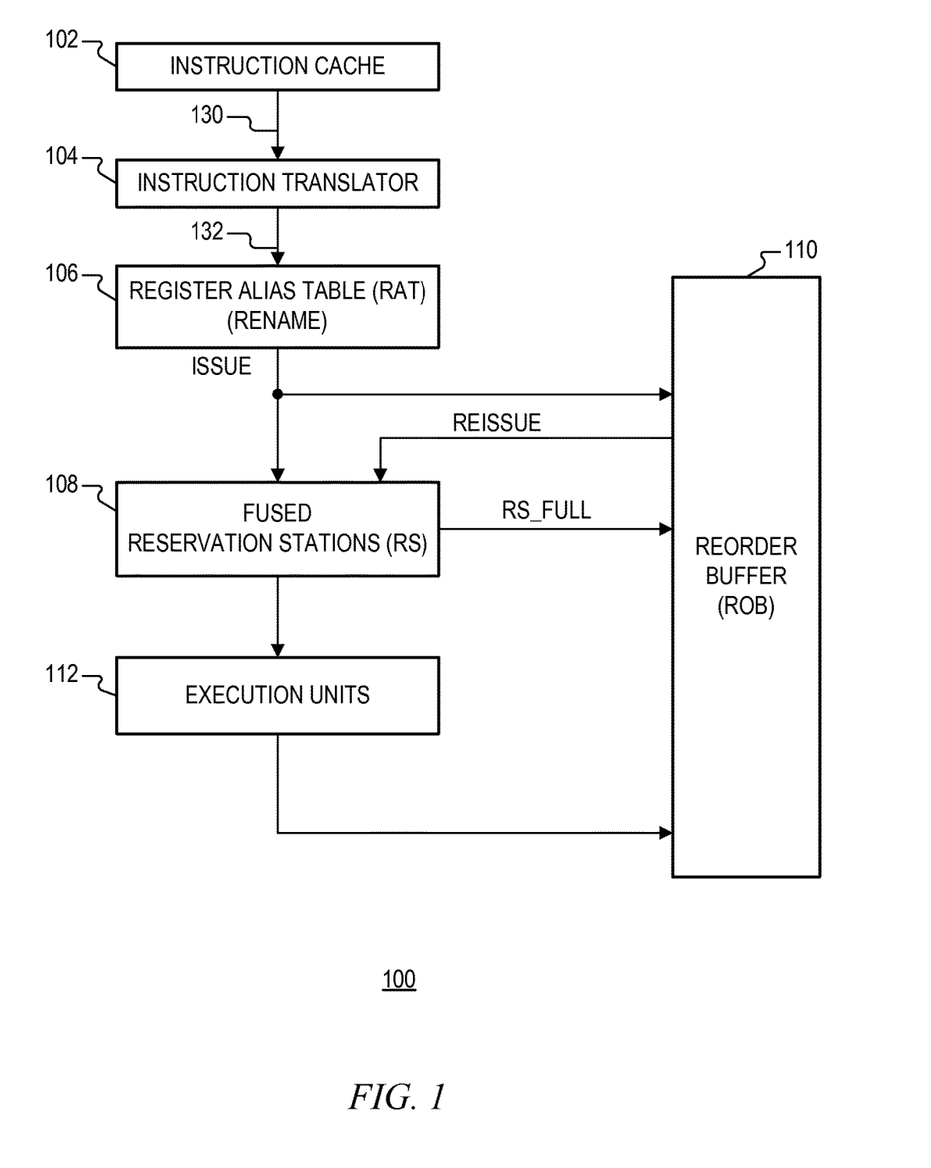
FIG. 1 is a simplified block diagram of a superscalar, pipelined microprocessor including a fused reservation stations (RS) module implemented according to one embodiment of the present invention.

FIG. 1 is a simplified block diagram of a superscalar, pipelined microprocessor 100 including a fused reservation stations (RS) module 108 implemented according to one embodiment of the present invention. The microprocessor 100 includes an instruction cache 102 that caches macroinstructions 130 of an instruction set architecture, such as the x86 instruction set architecture or the like. Additional or alternative instruction set architectures are contemplated. The microprocessor 100 includes an instruction translator 104 that receives and translates the macroinstructions 130 into microinstructions 132. The microinstructions 132 are then provided to a register alias table (RAT) 106 (a.k.a., "rename" table), which generates microinstruction dependencies of the microinstructions 132 and issues the microinstructions 132 in program order to the fused RS module 108 and to a reorder buffer (ROB) 110. The ROB 110 stores an entry for every microinstruction issued from the RAT 106. The fused RS module 108 dispatches the microinstructions to an appropriate one of multiple execution units 112.

The microinstructions issued from the RAT 106 (ISSUE) may typically be referred to as microinstructions, but are more generally referred to herein simply as "instructions." The fused RS module 108 asserts a full indication, shown as RS_FULL, when it is full or otherwise unable to receive additional instructions from the RAT 106. The ROB 110 is typically a larger structure and may continue to receive instructions after the fused RS module 108 is full. Eventually, the fused RS module 108 is able to dispatch instructions to the execution units 112 so that it may receive more instructions. After the fused RS module 108 indicates that it is no longer full (such as when the signal RS_FULL is de-asserted), instructions are temporarily reissued from the ROB 110 (REISSUE) to the fused RS module 108. When the ROB 110 catches up with the RAT 106, instructions are once again issued from the RAT 106.

As described further herein, the fused RS module 108 has an increased number of out-of-order (O-O-O) windows and thus becomes full less often. The fused RS module 108 has a smaller and more efficient design and thus has improved timing. The fused RS module 108 exhibits increased throughput and thus higher performance. The fused RS module 108 can reduce replay and can reduce the penalty when it does become full. The fused RS module 108 can reduce front end spaces or "bubbles" that insert pipeline delays.

Figure 2:
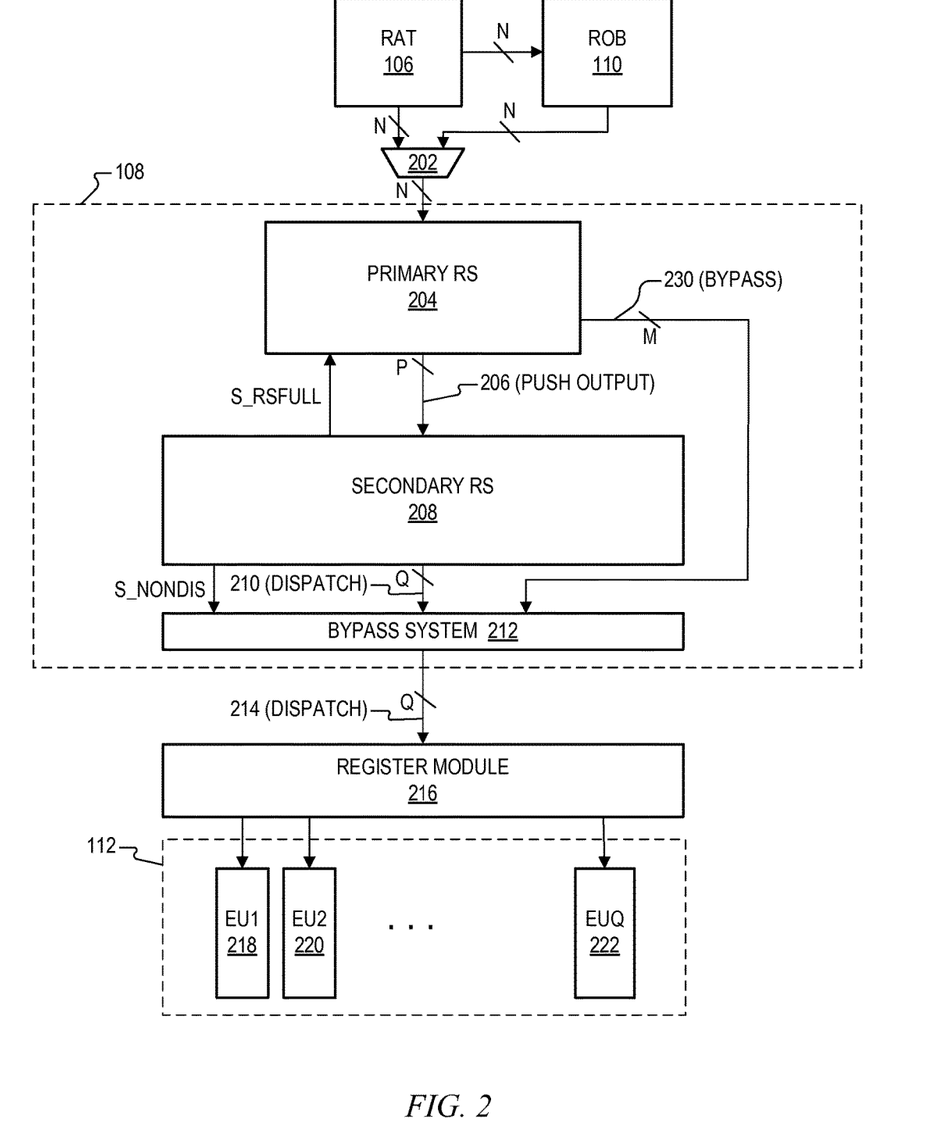
FIG. 2 is a more detailed block diagram of the fused RS module of FIG. 1 according to one embodiment.

FIG. 2 is a more detailed block diagram of the fused RS module 108 according to one embodiment, which is coupled between the RAT 106 and the ROB 110 and the execution units 112. The RAT 106 has an output provided to an input of the ROB 110. A multiplexer (MUX) 202 has a first input coupled to the output of the RAT 106, has a second input coupled to the output of the ROB 110, and has an output coupled to an input of a primary RS 204 within the fused RS module 108. The primary RS 204 has a push output 206 coupled to an input of a secondary RS 208. The secondary RS 208 has a dispatch output 210 provided to an input of a bypass system 212, which has a dispatch output 214 coupled to an input of a register module 216. As further described herein, the primary RS 204 further includes a bypass output 230 provided to an input of the bypass system 212, and the secondary RS 208 provides a signal S_NONDIS to the bypass system.

The register module 216 is shown interposed between the fused RS module 108 and the execution units 112 for providing corresponding instruction operands and instruction opcodes. The register module 216 may include any of the registers of the microprocessor 100, such as a physical register file (PRF), register files of the ROB 110, general purpose registers (GPR), etc., and further includes the circuitry and logic for collecting the information of the instructions for submittal to the execution units 112. In one embodiment, the fused RS module 108 only processes or handles "tags" of the individual instructions rather than the instructions themselves. This enables a reduction in size of the circuitry implementing the fused RS module 108 since it stores and processes a reduced amount of information. The register module 216 uses the tags of each instruction to collect the instruction information, including instruction operands and instruction opcodes and the like, and provides the collected instruction information to the execution units 112. Since each tag represents a corresponding instruction, the information is simply referred to herein as "instructions."

In operation, the primary RS 204 pushes issued instructions received from the RAT 106 or ROB 110 to the secondary RS 208. When the secondary RS 208 is full and unable to receive further instructions pushed from the primary RS 204, it asserts the S_RSFULL signal to the primary RS 204. The S_RSFULL signal is internal to the fused RS module 108 and is a different signal than the RS_FULL signal (FIG. 1). When the S_RSFULL signal is asserted, the primary RS 204 operates as a spill buffer for receiving and storing additional issued instructions. When the secondary RS 208 changes from full to not full, it de-asserts S_RSFULL and the primary RS 204 pushes any issued instructions stored within to the secondary RS 208. If the secondary RS 208 remains full when the primary RS 204 also becomes full, then the RS module 108 asserts the RS_FULL signal to the ROB 110 to indicate that it cannot receive another issued instruction. In that case, the instructions are only issued from the RAT 106 to the ROB 110 but are not provided to the RS module 108. Eventually, when the signal RS_FULL is de-asserted (caused by some dispatch operations of the primary RS 204 or the secondary RS 208), the fused RS module 108 switches to the reissue mode in which instructions are reissued from the ROB 110 (REISSUE) to the fused RS module 108. A delay of multiple clock cycles occurs after the RS_FULL signal is de-asserted until reissued instructions from the ROB 110 arrive. During the delay, the primary RS 204 may push stored issued instructions to feed the secondary RS 208 before reissued instructions from ROB 108 arrive. In this manner, bubbles introduced from the reissue pipeline are hidden.

The bypass system 212 monitors operation of the secondary RS 208 for determining when to employ a bypass function. If the secondary RS 208 has no instruction to be dispatched during the current cycle, then the bypass system 212 selects the bypass output 230 of the primary RS 204, and if the primary RS 204 has one or more instructions that are ready to be dispatched during the current cycle, these instructions may be directly dispatched to the execution units 112. The bypass system 212 determines whether the secondary RS 208 has an instruction to be dispatched during the current cycle according to the signal S_NONDIS, which indicates that none of the instructions stored in the secondary RS 208 are ready during the last cycle. The bypass function may be partial, meaning that even if the secondary RS 208 dispatches instructions in a given cycle but does not dispatch any instructions of one or more types (missing types), then the primary RS 204 may dispatch one or more instructions of the missing type(s) in that cycle via the bypass output 230. The bypass function provides an additional O-O-O window to improve overall RS throughput and performance as further described herein.

It is noted that each input and output that conveys issued and dispatched instructions through the pipeline of the microprocessor 100 may include multiple input or output paths for conveying multiple instructions at a time or per clock cycle. In the illustrated embodiment, for example, the RAT 106 and the ROB 110 each output up to "N" instructions to the fused RS module 108, in which "N" is a positive integer. It is noted that the phrase "up to" as used herein is intended to include less than the indicated number of instructions, including zero (0) instructions, during any given clock cycle. The MUX 202 is controlled based on whether operation is in normal mode (issue) or reissue mode as further described herein, and provides the selected N instructions to the primary RS 204. It is noted that the instructions temporarily stored in the fused RS module 108 are "issued" instructions even if reissued from the ROB 110. The primary RS 204 receives up to N issued instructions and may push up to "P" issued instructions to the secondary RS 208. The secondary RS 208 receives up to P issued instructions and may dispatch up to "Q" instructions to the bypass system 212. The primary RS 204 may alternatively dispatch up to "M" instructions via the bypass outputs 230 directly to the bypass system 212. The bypass system 212 dispatches up to Q instructions to the register module 216, which dispatches the up to Q instructions to the execution units 112. The numbers "M", "P" and "Q" are also positive integers.

The dispatch output 214 of the fused RS module 108, and accordingly the output of the register module 216, are both configured according to the number and type of each of the individual execution units 112. As shown, the execution units 112 include Q execution units EU1 218, EU2 220, . . . , EUQ 222. Each execution unit may be implemented according to any one of several types for processing corresponding instruction types, such as a floating point (FP) unit for processing floating point instructions, a load (LD) unit for processing load instructions, a store (ST) unit for handling store instructions, a combined load/store (LS) unit for handling "memory type" instructions including load or store instructions, and an integer (IN) unit for processing integer instructions.

The execution units 112 may include any number of each type. For example, one configuration includes 2 FP units, 2 LS units, and 2 IN units. It is understood that the types and numbers of the individual execution units 112 may vary according to the particular implementation. Each FP execution unit may be implemented as a single-instruction-multiple-data (SIMD) execution units, such as an MMX or an SSE unit or the like. One or more LS execution units may be incorporated within a memory order buffer (MOB) (not shown) or the like, including load/store execution pipes or separate load and store execution pipes. A MOB generally handles the memory type instructions to an external system memory (not shown). The external system memory may be interfaced with the microprocessor 100 (and the MOB) via a data cache (e.g., L2 data cache, not shown) and a bus interface unit (BIU, not shown). Each IN execution unit may include at least one integer arithmetic/logic unit (ALU) or the like. As shown in FIG. 1, the execution units 112 may provide their results to the ROB 110, which ensures in-order retirement of instructions.

The actual value of each of the numbers N, M, P and Q depend upon the particular configuration of the microprocessor 100. In one embodiment, for example, N may be 3 or N may be 4 depending upon the configuration and operation of the RAT 106 and the ROB 110. In one embodiment, M may be 3 for dispatching up to one of each type of instruction (FP, LS, IU), or M may be 6 for dispatching up to two of each type of instruction, although alternative numbers are contemplated. The numbers P and Q depend upon the type and configuration of the primary RS 204 and secondary RS 208 and the number and types of the execution units 112.

The primary RS 204 and the secondary RS 208 are each implemented with at least one type of RS structure, in which each RS structure includes at least one RS queue (RSQ). Each RSQ is a buffer or the like for temporarily storing issued instructions for ultimate dispatch to the execution units 112. Each RSQ has multiple entries for storing the issued instructions, in which the type of instructions stored in each RSQ depends upon the type of RS structure. There are many different types of RS structures that may be used for the primary RS 204 and the secondary RS 208. The primary RS 204 and the secondary RS 208 may each include a combination of different types of RS structures.

A unify RS structure includes only one unify RSQ that can store multiple instructions of any instruction type. Basically, the instructions are received and stored in order in the entries of the unify RSQ, although the instructions may be "popped" or otherwise removed from the unify RSQ out of order. Since there is only one RSQ that stores instructions of any type, the unify RSQ has superior entry efficiency of issued instructions and good throughput compared to other RS structures. Overall timing, however, is difficult to achieve with a unify RSQ when used alone to implement the RS functions of a microprocessor. Also, the dispatching functions from a unify RSQ are somewhat complex when used alone. The dispatching logic of the unify RSQ must determine which instructions are ready to dispatch, must determine which execution units are ready to receive instructions, and must distinguish between the different types of instructions for dispatch to the proper execution unit. These factors become even more difficult when there are many execution units in the microprocessor 100.

When used as the primary RS 204 of the fused RS module 108, the superior entry efficiency of the unify RS structure may be used to significant advantage. Also, the dispatching logic may be simplified since most stored instructions are not dispatched to the execution units but instead may be simply pushed to the secondary RS 208. The dispatching logic may further determine which instructions are ready for dispatch, and these instructions may be selected by the bypass system 212 for dispatch via the bypass output 230 when the secondary RS 208 has no instruction to be dispatched in a given clock cycle.

A split RS structure includes a plurality of separate split RSQs, each of which corresponds to at least one of the execution units 112. Each split RSQ, therefore, only stores issued instructions of a certain type. For example, the split RS structure includes one or more IN split RSQs, one or more FP RSQs, and one or more memory type (LD, ST, LS) split RSQs. The dispatching logic of the split RS structure is more simple. The split RS structure, therefore, has poor entry efficiency, but has good timing and may be implemented with simple logic. When used as the only RS structure with multiple execution units, the entry logic is complex which may decrease throughput efficiency.

A cluster RS structure includes multiple cluster RSQs, in which each cluster RSQ stores multiple instruction types and corresponds to multiple types of the execution units 112. The number of cluster RSQs corresponds with the number of duplicates of the execution units. A cluster RS structure has good entry efficiency, but has a penalty on forwarding path due to path delay.

A multiple dispatch RS structure has multiple RSQs, each storing only one type of instruction and each corresponding to multiple execution units of the same type. Thus, each RSQ of the multiple dispatch RS structure is configured to output multiple instructions at a time. There are several types of multiple dispatch RS structures depending upon the selection criteria. For example, a first oldest-second oldest (first/second oldest) multiple dispatch RS structure has a select function in which one or both of the first oldest instruction and the second oldest instruction are selected for output for each multiple dispatch RSQ in given cycles. A first/second oldest multiple dispatch RS structure has fair efficiency, but generally has more complex logic and less than optimal timing when used alone to implement the RS function. It is a relatively simple matter for the hardware to determine the oldest instruction ready for dispatch. It is more difficult, however, for the hardware to determine the next oldest instruction ready for dispatch while meeting timing requirements since this determination is serialized. In particular, the oldest ready instruction is determined first, and only then can the next oldest ready instruction be determined.

Figure 10:
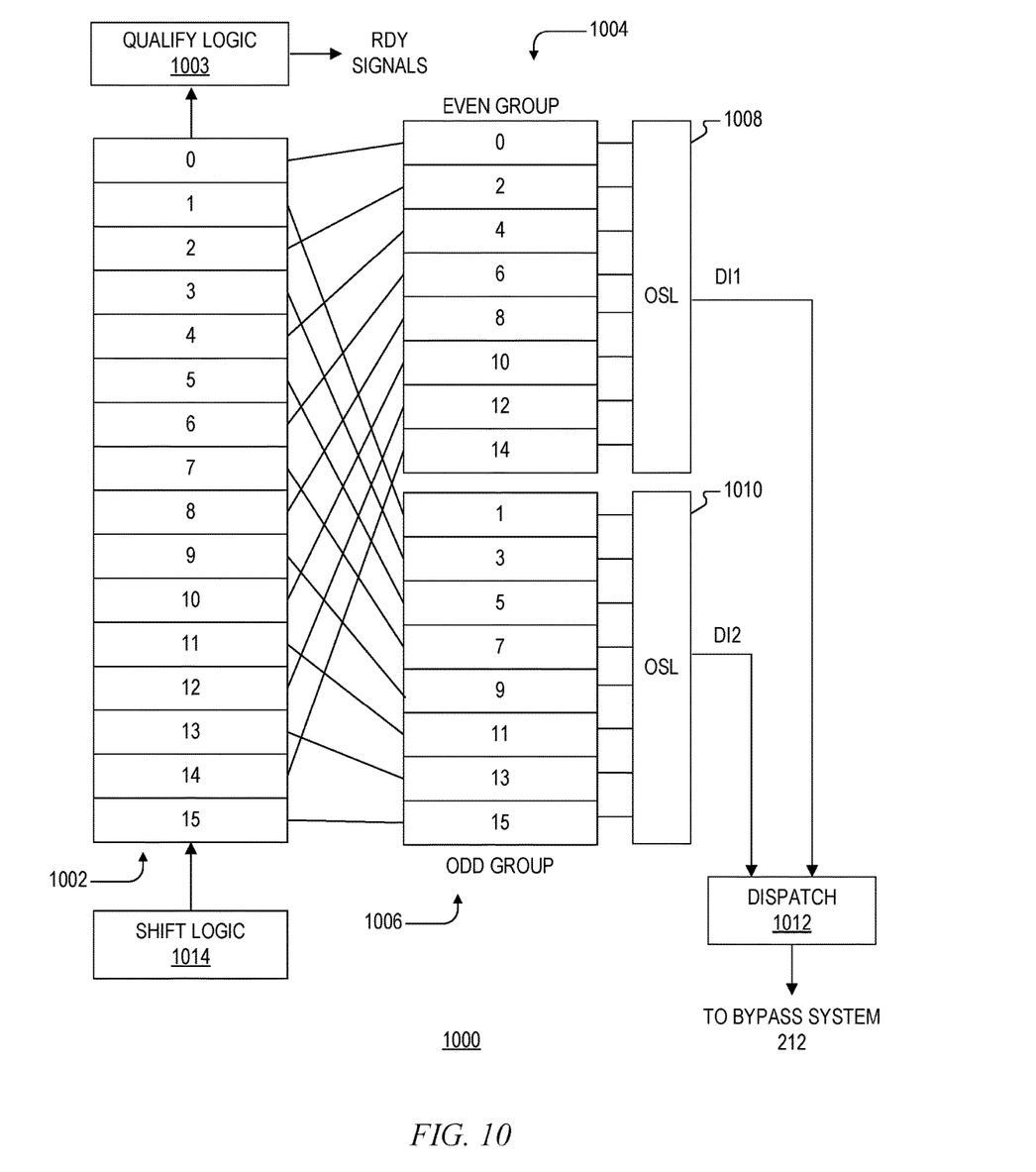
FIG. 10 is a simplified diagram illustrating an odd-even multiple dispatch structure that may be used to implement the secondary RS.

Another multiple dispatch RS structure, for example, is an odd-even multiple dispatch RS structure 1000 as shown in FIG. 10, such as that described in U.S. patent application Ser. No. 14/643,051 entitled "Parallelized Multiple Dispatch System And Method. For Ordered Queue Arbitration," which is incorporated herein in its entirety. The odd-even multiple dispatch RS structure 1000 has a select function in which the instructions are divided into separate odd and even queues within each internal RSQ, so that both of an even instruction and an odd instruction are selected for output for each internal RSQ in any given cycle. As shown in FIG. 10, an ordered shift queue 1002 is divided into two groups, including an even group 1004 and an odd group 1006, so that up to two ready instructions may be dispatched in parallel. Qualify logic 1003 scans the instructions in the ordered shift queue 1002 to determine whether any one or more of the instructions are ready to be dispatched for execution and provides corresponding ready (RDY) signals. The even-numbered entries in the even group 1004 are coupled to corresponding inputs of ordered select logic (OSL) 1008 for providing a first dispatch instruction DI1, and the odd-numbered entries in the odd group 1006 are coupled to inputs of ordered select logic 1010 for providing a second dispatch instruction DI2. The ordered select logic 1008 and 1010 provides the oldest instruction (like instruction DI1 and DI2) in the corresponding group that is ready to be dispatched to dispatch logic 1012 having outputs provided to the bypass system 212. Shift logic 1014 shifts the instructions in the ordered shift queue 202 after one or more instructions are dispatched leaving one or more vacant entries. The odd-even multiple dispatch RS structure provides adequate efficiency, good timing and throughput, and may be implemented with relatively simple logic circuitry. When used alone as the RS structure of a processor, the odd-even multiple dispatch RS structure provides better performance than the first/second oldest multiple dispatch RS structure.

As described further herein, an odd-even multiple dispatch RS structure includes multiple RSQs, each internally subdivided by two groups for dispatching up to two instructions (odd/even) per clock cycle. In a more general case, each internal RS queue may be subdivided by a greater number, such as by 3 or 4 or more for dispatching even a greater number of instructions per clock cycle.

As shown in FIG. 2, the fused RS module 108 includes multiple (or two) RS stages that are stacked or sequentially ordered for storing and dispatching the issued instructions. The fused RS module 108 provides significant benefits in which the advantages of certain RS structures may be enhanced while the disadvantages may be reduced or otherwise minimized. The combination of the front-end primary RS 204 with the secondary RS 208 provides improved overall performance as compared to any of the RS structures used alone. The primary RS 204 may provide a front-end spill buffer function for buffering additional issued instructions to reduce the incidence of transitioning to the reissue mode when the secondary RS 208 is full (for example, one RSQ of the secondary RS 208 is full). As described further herein, the fused (multiple stage or stacked) structure can reduce replay, reissue and the RS full penalty. The fused structure can reduce front end timing bubbles because of the improved buffering function. Overall timing may be improved because both the primary RS 204 and the secondary RS 208 may be made smaller with simpler logic. Furthermore, when the secondary RS 208 becomes full or is otherwise unable to meet timing, it may be bypassed via the bypass output 230 when any one or more instructions within the primary RS 204 are ready to be dispatched directly to the execution units 112.

The primary RS 204 and the secondary RS 208 may each be implemented with any of the RS structures described, or even a combination of such RS structures. The unify RS structure has superior entry efficiency compared to other RS structures so that it is a good choice to implement the primary RS 204. The cluster RS structure also has better entry efficiency as compared to the remaining RS structures, so that it may also be used as the primary RS 204. Although a combination of unify and cluster RS structures may be used, such may increase complexity thus possibly reducing overall advantages. The secondary RS 208 may be implemented using any one or more of the other RS structures, including a combination of the other RS structures.

Figure 3:
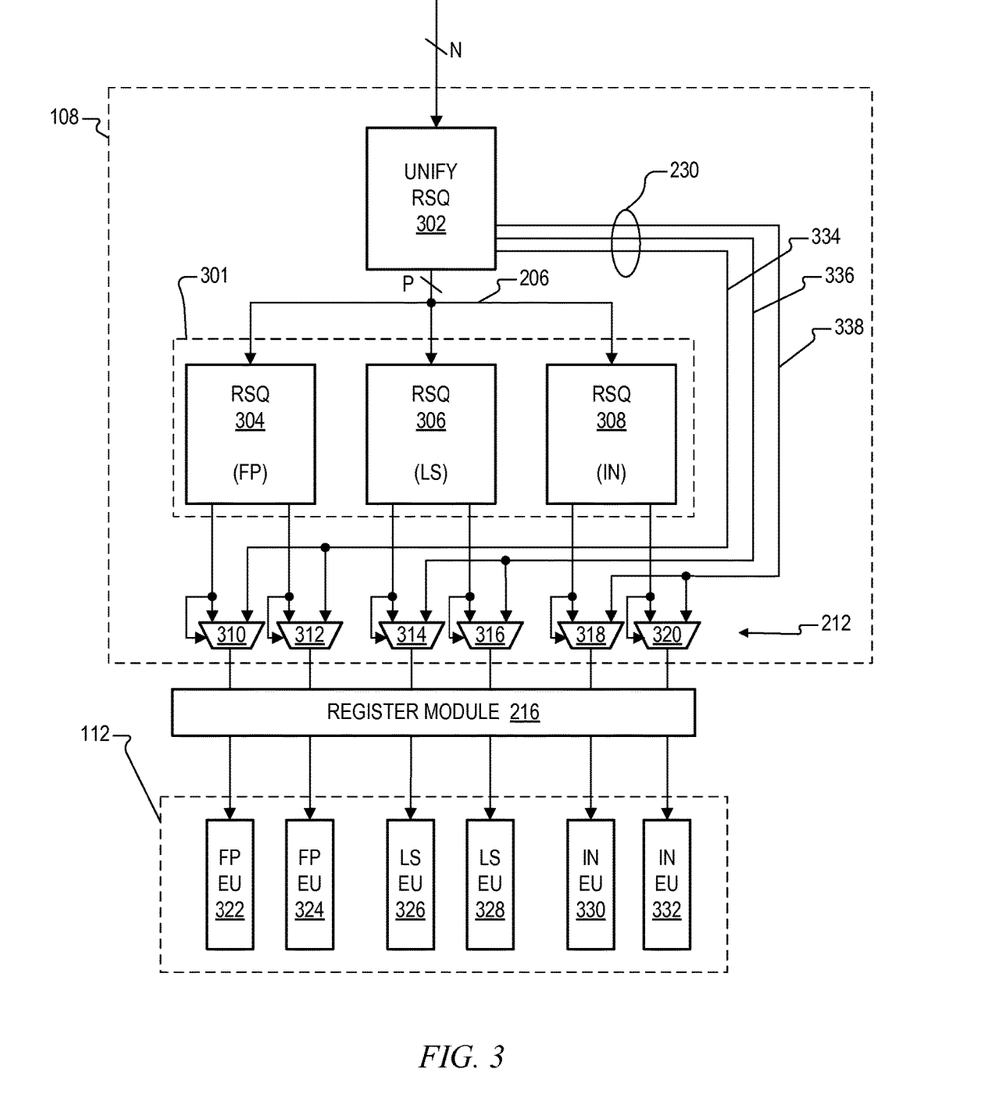
FIG. 3 is a block diagram of the fused RS module of FIG. 1 according to one embodiment with a unify RSQ implementing the primary RS and a multiple dispatch RS implementing the secondary RS.

FIG. 3 is a block diagram of the fused RS module 108 according to one embodiment with a unify RSQ 302 implementing the primary RS 204 and a multiple dispatch RS 301 implementing the secondary RS 208. The multiple dispatch RS 301 includes a first RSQ 304 for FP instructions, a second RSQ 306 for memory (load and store) instructions (LS), and a third RSQ 308 for integer instructions (IN). The unify RSQ 302 receives up to N instructions and pushes up to P instructions in any given cycle, in which the RSQs 304, 306 and 308 (304-308) collectively have P inputs for receiving up to P instructions at a time. In any given cycle, the up to P instructions pushed from the unify RSQ 302 may all be provided to any one of the RSQs 304-308, or may be distributed in any manner depending upon the type of instructions being pushed.

As shown in FIG. 2, the secondary RS 208 has Q outputs for dispatching up to one instruction for each of the Q execution units 112. In the illustrated embodiment of FIG. 3, there are six execution units (EU) 322, 324, 326, 328, 330, 332 (322-332) including two of each type (FP, LS, IN), in which it is understood that a different number of the execution units 112 and different types may be included. In this case, Q=6 and each RSQ 304-308 is configured to dispatch up to 2 instructions of a given type at a time. It is noted that in alternative configurations, each RSQ 304-308 may be implemented to dispatch more than two instructions at a time.

The bypass system 212 is shown implemented with six MUXes 310, 312, 314, 316, 318 and 320 (310-312) for dispatching up to 6 instructions at a time to the execution units 112 (for Q=6). A first output of the RSQ 304 is provided to a first input of the MUX 310, and a second output of the RSQ 304 is provided to a first input of the MUX 312. In a similar manner, a first output of the RSQ 306 is provided to a first input of the MUX 314, a second output of the RSQ 306 is provided to a first input of the MUX 316, a first output of the RSQ 308 is provided to a first input of the MUX 318, and a second output of the RSQ 308 is provided to a first input of the MUX 320. Each output of each of the RSQs 304-308 includes a control signal for controlling the corresponding one of the MUXes 310-312 for selecting between the corresponding output of the RSQs 304-308 and a corresponding bypass output 230.

The output of the MUX 310 provides up to one instruction (via the register module 216) to the FP execution unit 322, the output of the MUX 312 provides up to one instruction (via the register module 216) to the FP execution unit 324, the output of the MUX 314 provides up to one instruction (via the register module 216) to the LS execution unit 326, the output of the MUX 316 provides up to one instruction (via the register module 216) to the LS execution unit 328, the output of the MUX 318 provides up to one instruction (via the register module 216) to the IN execution unit 330, and the output of the MUX 320 provides up to one instruction (via the register module 216) to the IN execution unit 332.

The unify RSQ 302 has 3 bypass outputs (M=3) 334, 336 and 338 (334-338) for providing up to 3 bypass instructions of 3 types at a time, in which the first bypass output 334 is coupled to the second input of each of the MUXes 310 and 312 for dispatching the bypass instruction of FP type, the second bypass output 336 is provided to the second input of each of the MUXes 314 and 316 for dispatching the bypass instruction of LS type, and the third bypass 338 is provided to the second input of each of the MUXes 318 and 320 for dispatching the bypass instruction of IN type. Thus, the unify RSQ 302 may directly dispatch up to one of each type of instruction (FP, LS, IN) in any given cycle. When the multiple dispatch RS 301 is unable to provide an output from any given RSQ (e.g., such as when one or more RSQs are empty) which could be detected by the dispatch output of the given RSQ, and when the unify RSQ 302 has at least one instruction ready for execution, the MUXes 310-320 may be controlled (by the bypass system 212) to select one or more of the bypass outputs 334-338 so that the unify RSQ 302 may directly provide ready instructions to corresponding ones of the execution units 112.

In an alternative embodiment for M=6, each bypass output 334-338 may include two outputs each, one bypass output to each of the MUXes 310-320. In this manner, the unify RSQ 302 may output up to two of each type of instruction.

In one embodiment, the multiple dispatch RS 301 is implemented according to the odd-even multiple dispatch RS structure. The combined structure of the unify RSQ 302 and the multiple dispatch RS 301 with odd-even selection maintains substantially all of the advantages and reduces or otherwise minimizes the disadvantages of each of the unify RS and odd-even multiple dispatch RS structures. The unify RSQ 302 serves as a front-end spill buffer function as previously described. Also, the fused structure can reduce replay, reissue and the RS full penalty. The fused structure can reduce front end timing bubbles, and overall timing is substantially improved because each RS structure may be made smaller. Furthermore, the multiple dispatch RS 301 implemented with the RSQs 304-308 may be bypassed when any one or more instructions within the unify RSQ 302 are ready for dispatch directly to the execution units 112.

In another embodiment, the multiple dispatch RS 301 is implemented according to the first/second oldest multiple dispatch RS structure.

Figure 4:
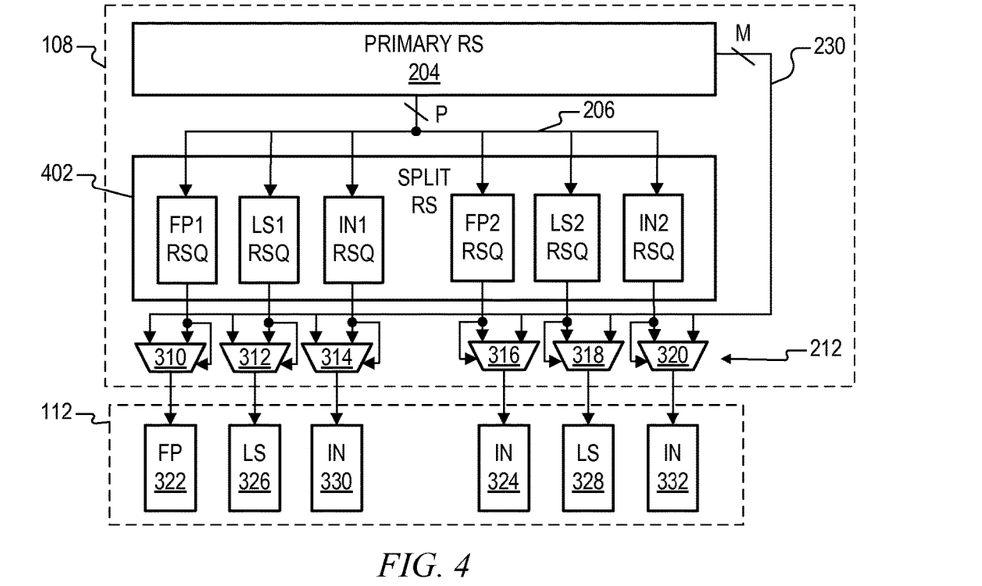
FIG. 4 is a simplified block diagram of the fused RS module of FIG. 1 according to another embodiment in which the secondary RS is implemented using a split RS.

FIG. 4 is a simplified block diagram of the fused RS module 108 according to another embodiment including the primary RS 204 and a split RS 402 implementing the secondary RS 208. The primary RS 204 may be implemented as a unify RSQ similar to that shown in FIG. 3, or by any of the other RS structures as previously described. Several details that are present are omitted from FIG. 4 for clarity, such as the register module 216. The execution units 112 are configured in similar manner including a pair of FP EUs 322 and 324, a pair of LS EUs 326 and 328, and a pair of IN EUs 330 and 332. The bypass system 212 is implemented with the MUXes 310-320 in similar manner, except that the MUX 310 has its output coupled to provide instructions to the FP EU 322, the MUX 312 has its output coupled to provide instructions to the LS EU 326, the MUX 314 has its output coupled to provide instructions to the IN EU 330, the MUX 316 has its output coupled to provide instructions to the IN EU 324, the MUX 318 has its output coupled to provide instructions to the LS EU 328, and the MUX 332 has its output coupled to provide instructions to the IN EU 332.

The split RS 402 includes a separate RSQ for each of the execution units, including an FP1 RSQ having an output coupled to one input of the MUX 310 (including a control signal provided to the control input of the MUX 310), an LS1 RSQ having an output coupled to one input of the MUX 312 (including a control signal provided to the control input of the MUX 312), an IN1 RSQ having an output coupled to one input of the MUX 314 (including a control signal provided to the control input of the MUX 314), an FP2 RSQ having an output coupled to one input of the MUX 316 (including a control signal provided to the control input of the MUX 316), an LS2 RSQ having an output coupled to one input of the MUX 318 (including a control signal provided to the control input of the MUX 318), and an IN2 RSQ having an output coupled to one input of the MUX 320 (including a control signal provided to the control input of the MUX 320). The push output 206 of the primary RS 204 is provided to the inputs of each the RSQs of the split RS 402. The bypass outputs 230 of the primary RS 204 are distributed among the other inputs of the MUXes 310-320. The specific number and configuration of the primary and bypass outputs 206 and 230 may vary based on the particular implementation.

Figure 5:
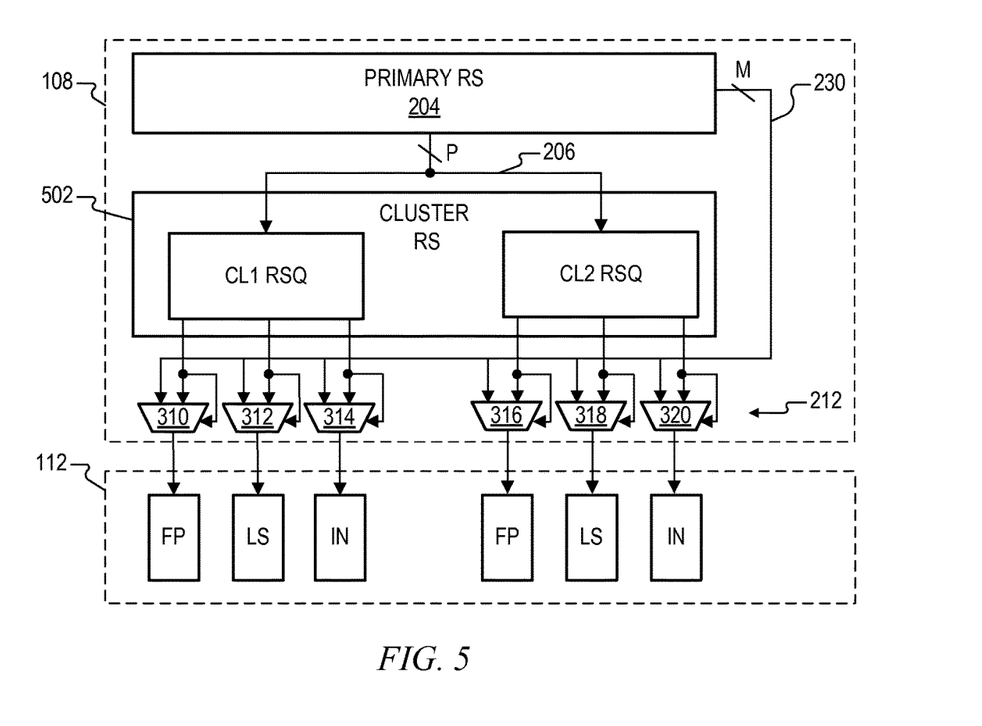
FIG. 5 is a simplified block diagram of the fused RS module of FIG. 1 according to yet another embodiment in which the secondary RS is implemented using a cluster RS.

FIG. 5 is a simplified block diagram of the fused RS module 108 according to yet another embodiment including the primary RS 204 and a cluster RS 502 implementing the secondary RS 208. The primary RS 204 may be implemented as a unify RS structure similar to that shown in FIG. 3, or by any of the other RS structures as previously described. Several details that are present are omitted from FIG. 5 for clarity, such as the register module 216. The bypass system 212 and the execution units 112 are configured in substantially similar manner as that shown in FIG. 4 for the split RS case. The cluster RS 502 includes two RS queues CL1 RSQ and CL2 RSQ, each having inputs receiving instructions from the push output 206 of the primary RS 204 for receiving one or more instructions of each type from the primary RS 204. The CL1 RSQ and CL2 RSQ each have multiple outputs, each of which outputs up to one of each type of instruction through the bypass system 212 to corresponding ones of the execution units 112, and each RSQ output providing a control signal to control the corresponding MUX. The bypass output 230 of the primary RS 204 is distributed among the other inputs of the MUXes 310-320 in a similar manner. The specific number and configuration of the push and bypass outputs 206 and 230 may vary based on the particular implementation.

Although the secondary RS 208 has been shown implemented with a selected one of the RS structures described herein (e.g., multiple dispatch, split, cluster), the secondary RS 208 may be implemented with a combination of such structures.

Figure 6:
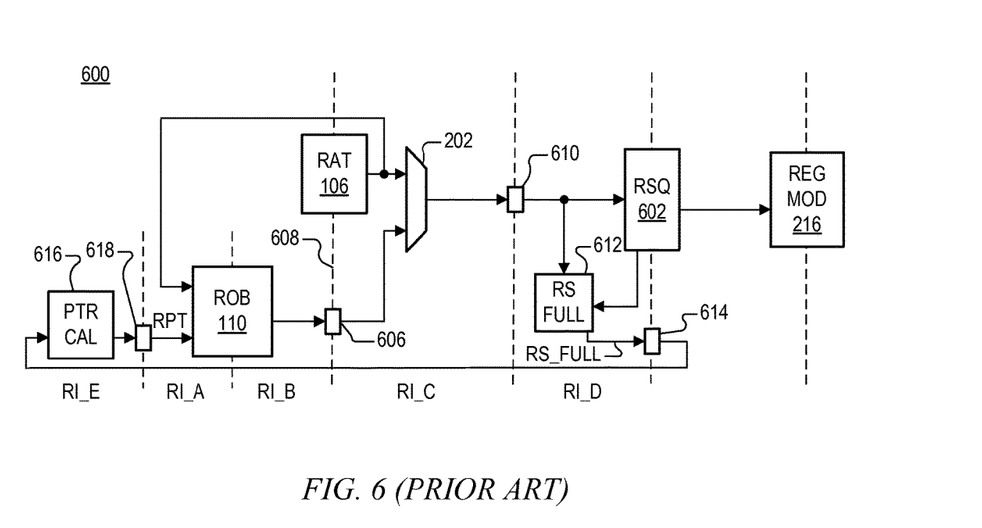
FIG. 6 is a simplified block diagram of a pipeline including a conventional RS structure.

FIG. 6 is a simplified block diagram of a pipeline 600 including a conventional RS structure shown as RSQ 602. The RSQ 602 represents any one of the known RS structures used alone as the only RS structure. The signal paths are shown and described in FIG. 6 are in singular form, where it is understood that multiple instructions may be processed through the pipeline 600. For example, it is common that a microprocessor pipeline issues up to four instructions and dispatches up to six instructions in a given clock cycle. The output of the RAT 106 issues instructions to one input of the MUX 202 and to one input of the ROB 110. The ROB 110 has a reissue output providing reissue instructions to an input of a latch stage 606, having its output provided to the other input of the MUX 202. Each latch stage, including the latch stage 606, includes multiple latches controlled by a synchronous clock signal for synchronizing data throughput. The output of the ROB 110 is latched through the latch stage 606 to the MUX 202 in response to the clock. Vertical dashed lines demark borders between the synchronous stages of the pipeline 600. A vertical dashed line 608 aligning the latch stage 606 and the RAT 106, for example, represents that the outputs of the RAT 106 and the latch stage 606 are synchronized with each other and provided in the same clock cycle. The RAT 106 and the ROB 110 have internal latch stages (not shown) for providing the issue/reissue instructions synchronous with the clock signal. The output of the ROB 110 is one clock cycle behind the output of the RAT 106 relative to the MUX 202.

The output of the MUX 202 is provided to an input of another latch stage 610, having its output coupled to the input of the RSQ 602 and to an input of RS FULL logic 612. The latch stage 610 synchronizes issue/reissue instructions provided to the RSQ 602 and insures proper timing of the pipeline 600. The RS FULL logic 612 receives the number of empty entries in the RSQ 602 from the RSQ 602 and the number of instructions that are to be stored into the RSQ 602 during the current cycle from the latch stage 610, and determines and outputs an RS_FULL signal to an input of another latch stage 614. The latch stage 614 has its output coupled to an input of a Reissue Pointer calculator 616, which provides a Reissue Pointer RPT through another latch stage 618 to another input of the ROB 110. The output of the RSQ 602 dispatches instructions to the register module 216. The pipeline stages, at least relative to the reissue mode, are separately marked as RI_E (in which the latch stage 618 is located), RI_A (output of latch stage 618), RI_B (output of the ROB 110), RI_C (output of the latch stage 606), and RI_D (in which the RS FULL logic 612 is located and at output of latch stage 610).

During normal operation, the MUX 202 selects the output of the RAT 106 which issues instructions (or instruction tags) to the RSQ 602 and to the ROB 110. The RSQ 602 dispatches received instructions to the execution units 112 via the register module 216. If none of the instructions in the RSQ 602 are ready to be dispatched (e.g., the operands of the instructions are not ready yet), they may accumulate in the RSQ 602 until it becomes full. When the RSQ 602 is full and unable to receive more instructions, the RSQ FULL logic 612 asserts the RS_FULL signal. When RS_FULL is asserted, the MUX 202 is disabled and does not output additional instructions. Additional instructions issued from the RAT 106 continue to accumulate within the ROB 110, which may become full if the RSQ 602 remains full for a sufficient number of cycles.

When the RS_FULL signal was de-asserted (for example, one cycle after the RS_FULL signal was asserted), the pipeline reverts to the reissue mode in which the MUX 202 instead selects the output of the ROB 110 via the latch stage 606. The MUX 202 may not be switched right away, but is eventually switched for reissue mode as further described herein. Even if the ROB 110 "reissues" subsequent instructions to the RSQ 602 via the reissue path (latch stage 606, MUX 202, latch stage 610), instructions are only received by the RSQ 602 in order so that the next instruction it takes is the first instruction rejected by the RSQ 602. When the RS FULL logic 612 de-asserts the RS_FULL signal in the reissue stage RI_D, the de-asserted RS_FULL signal is passed to the Reissue Pointer calculator 616 via the latch stage 614. In the next clock cycle in stage RI_E, the Reissue Pointer calculator 616 determines a corresponding Reissue Pointer RPT. In the next clock cycle in stage RI_A, the RPT is passed to the ROB 110 via the latch stage 618. The Reissue Pointer RPT points to the instruction entry within the ROB 110 corresponding to the first instruction rejected by the RSQ 602, so that operation can proceed from that instruction. In the next clock cycle in stage Ri_B, that first rejected instruction may be read from the ROB 110 according to the RPT. In the next clock cycle in stage RI_C, the first instruction (first rejected instruction) is output by the MUX 202 from the latch stage 606 and the second instruction is output by the ROB 110. In the next clock cycle, the first instruction is once again presented to the RSQ 602. It is noted that it takes at least 4 clock cycles (stages RI_E RI_A, RI_B, RI_C) since the RS_FULL signal is de-asserted until the first instruction is finally being provided back to the input of the RSQ 602. Furthermore, if the RSQ 602 is full again, then several subsequent instructions may circulate in the reissue path via the ROB 110 until the RSQ 602 is no longer full. Eventually, when the ROB pointer (of the ROB 110) becomes equal to the RAT pointer (of the RAT 106), operation reverts back to normal operation in which the MUX 202 is switched back to the output of the RAT 106.

The reissue path of the conventional pipeline inserts "bubbles" or delays upon de-assertion of RS_FULL by the RSQ 602. Even when RS_FULL is de-asserted the very next clock cycle after being asserted, the Reissue Pointer RPT is first calculated and provided to the ROB 110, which then may output the corresponding (first rejected) instruction in the next cycle, which takes two more clock cycles before finally being provided back to the input of the RSQ 602. The shortest reissue delay, therefore, is at least four clock cycles for the reissue mode of operation. Furthermore, if the RSQ 602 is full again, then additional delay cycles are inserted.

Figure 7:
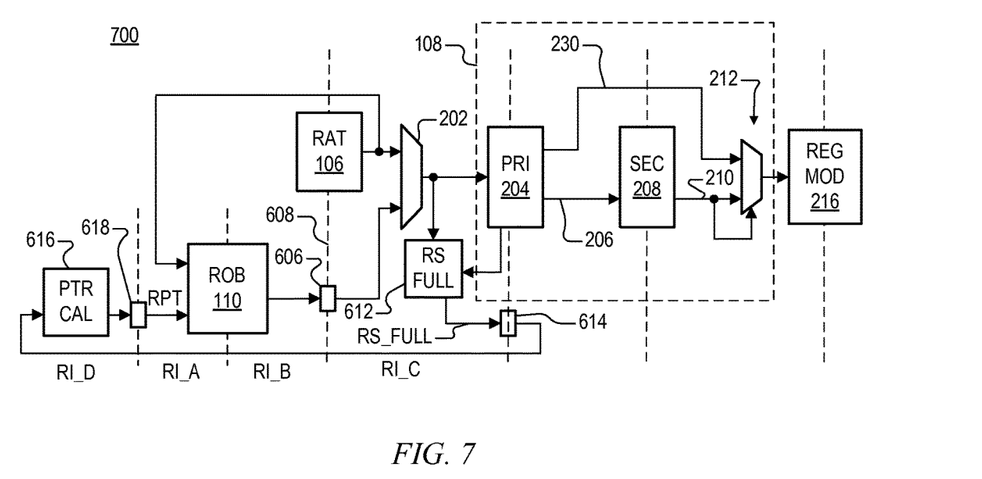
FIG. 7 is a simplified block diagram of a pipeline including a fused RS structure according to one embodiment of the present invention.

FIG. 7 is a simplified block diagram of a pipeline 700 including a fused RS structure according to one embodiment of the present invention. Components in the pipeline 700 that are similar to those of the pipeline 600 have the same reference numerals. The front end of the pipeline 700 is similar, including the RAT 106, the ROB 110, the MUX 202 the latch stage 606, the Reissue Pointer calculator 616, and the latch stage 618 coupled in similar manner. The RSQ 602 is replaced by the fused RS module 108, in which the latch stage 610 is replaced by the primary RS 204 having an internal latch stage (not shown) to meet similar timing during normal operation. The reissue pipeline stages RI_A (output of latch stage 618), RI_B (output of the ROB 110, and RI_C (output of latch stage 606) are named in similar manner. In this case, the reissue pipeline stage RI_E is renamed RI_D (or otherwise RI_D is moved and RI_E is eliminated). In stage RI_C the RS FULL logic 612 determines the RS_FULL signal according to the number of empty entries in the primary RS 204 and the number of instructions that will be stored into the primary RS 204 during the current cycle from the MUX 202. The RS FULL signal is provided to the latch stage 614, having its output provided back to the input of the Reissue Pointer calculator 616 in similar manner, except that the latch stage 614 is aligned with the primary RS 204. In this manner, the Reissue Pointer RPT is calculated by the Reissue Pointer calculator 616 (in reissue stage RI_D) and provided to the ROB 110 (in reissue stage RI_A) a cycle earlier after de-assertion of the RS_FULL signal as compared to the pipeline 600.

The fused RS module 108 also includes the secondary RS 208, having an input receiving the push output 206 of the primary RS 204. The dispatch output 210 of the secondary RS 208 is provided the first input of the bypass system 212. The bypass output 230 of the primary RS 204 is provided to the second input of the bypass system 212, which has an output providing dispatched instructions to the register module 216 for providing the instructions to the execution units 112 as previously described. The bypass system 212 selects between the dispatch output 210 of the secondary RS 208 and the bypass output 230 for dispatching instructions according to whether there is any instruction in the secondary RS 208 ready to be dispatched during the current clock cycle. The fused RS module 108 may be implemented according to any of the configurations described herein, such as those shown in FIGS. 2-5.

When the secondary RS 208 is full or otherwise unable to dispatch an instruction from any RSQ, and if the primary RS 204 has at least one instruction ready for dispatch, then the primary RS 204 may dispatch at least one instruction via the bypass output 230 (including partial bypass dispatch as previously described). Furthermore, when the secondary RS 208 is full, instructions continue to be issued into the primary RS 204 until the secondary RS 208 is no longer full or until the primary RS 204 becomes full. When the primary RS 208 is also full, the RS_FULL signal is asserted, and later is de-asserted to initiate reissue mode. When the RS_FULL signal is de-asserted due to the secondary RS 208 is no longer full, the de-asserted RS_FULL signal passes through the RS FULL logic 612 and is latched through the latch stage 614, the Reissue Pointer calculator 616 calculates a Reissue Pointer RPT according to the de-asserted RS_FULL signal, and the Reissue Pointer RPT is latched through the latched stage 618 and provided to the ROB 110. When the secondary RS 208 changes from full to not full, rather than having to just wait for reissue instructions from the ROB 110 during the three clock cycles (stages RI_D, RI_A and RI_B), instructions may be pushed from the primary RS 204 into the secondary RS 208 to feed the hungry secondary RS 208 before reissued instructions from ROB 110 arrives.

The reissue operation of the pipeline 700 is similar to that of the pipeline 600, except that the reissue path has less delay. For example, if RS_FULL is de-asserted the very next clock cycle after being asserted, the Reissue Pointer RPT is calculated and provided to the ROB 110, which then may output the corresponding (first rejected) instruction in the next cycle, which only one more clock cycles before finally being provided back to the input of the primary RS 204. The shortest reissue delay, therefore, is only three clock cycles. Also, once the secondary RS 208 is no longer full, the primary RS 204 begins feeding instructions to the secondary RS 208 during the reissue process. Instruction dispatch delays to the execution units 112 is therefore reduced or otherwise minimized.

Figure 8:
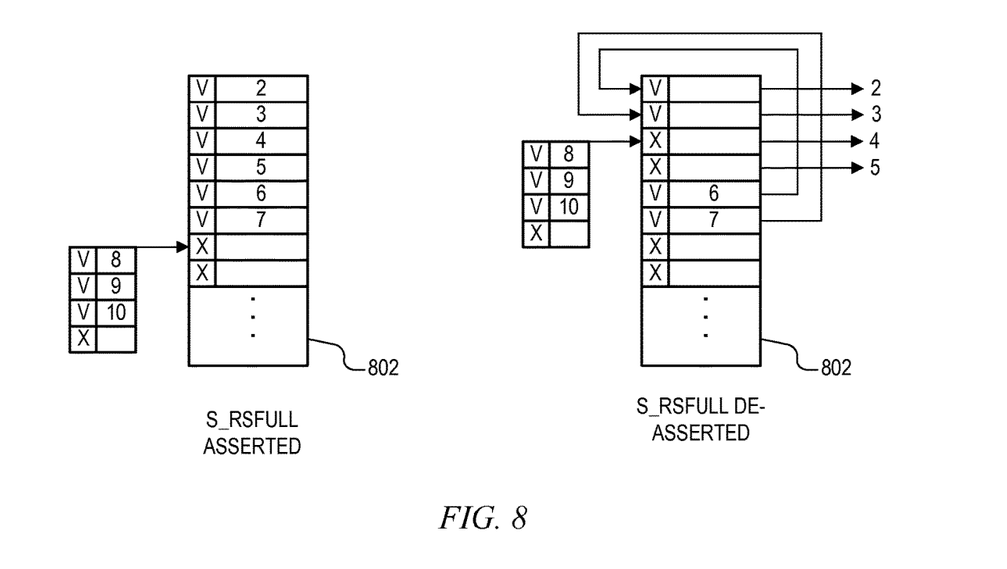
FIG. 8 is a pair of simplified diagrams illustrating operation of the primary RS of FIG. 2 configured as an RSQ with a shift feature according to one embodiment.

FIG. 8 is a pair of simplified diagrams illustrating operation of the primary RS 204 configured as an RSQ 802 with a shift feature according to one embodiment. The RSQ 802 may be used within any type of RS structure including the unify RS structure. A first diagram on the left illustrates operation of the RSQ 802 when S_RSFULL is asserted to indicate that the secondary RS 208 is full so that instructions may be accumulated in the primary RS 204 (herein RSQ 802). As shown, instructions 2-7 are stored within the first six entries 1-6 of the RSQ 802, in which each valid instruction is marked with a valid value "V". Additional instructions 8-10 are being issued from MUX 202 to the RSQ 802, such as from the RAT 106 or the ROB 110. The instructions 8-10 are about to be stored into entries 7-9, respectively, of the RSQ 802 while S_RSFULL remains asserted.

A second diagram on the right illustrates operation of the RSQ 802 when S_RSFULL is de-asserted to indicate that the secondary RS 208 is no longer full so that instructions are pushed into the secondary RS 208. In this case, up to four instructions at a time may be popped out of the RSQ 802, which also shifts up to four instructions at a time within the RSQ 802 to maintain ordering. As with the first diagram, instruction numbers 2-7 were stored within the first six entries 1-6, and additional instructions 8-10 are being pushed into to the RSQ 802. In this case, however, the S_RSFULL signal is de-asserted so that instructions 2-5 are popped from the queue to be pushed into the secondary RS 208. Rather than push the additional instructions 8-10 into the entries 7-9, respectively, instructions 6-7 are shifted up four positions to the first two entries 1-2, and the additional instructions 8-10 are instead pushed into now empty entries 3-5 of the RSQ 802.

The shift feature enables instructions to accumulate within the RSQ 802 rather than being reissued back to the ROB 110 to reduce front end bubbles. Furthermore, when any number of instructions are dispatched via the bypass output 230, the shift feature is used to push lower (or newer) instructions into the emptied entries to maintain order and reduce bubbles in the pipeline. Furthermore, the primary RS 204 receives N (for example, N=3 in FIG. 8) issued instructions from MUX 202 but pushes up to P (for example, P=4 in FIG. 8) issued instructions to the secondary RS 208. P may be greater than N, that is, MUX 202 may only output 3 instructions during a given cycle but the secondary RS 208 could still receive 4 instructions during that given cycle to squeeze bubbles between instructions which introduced from frontend pipeline like the instruction translator 104.

Figure 9:
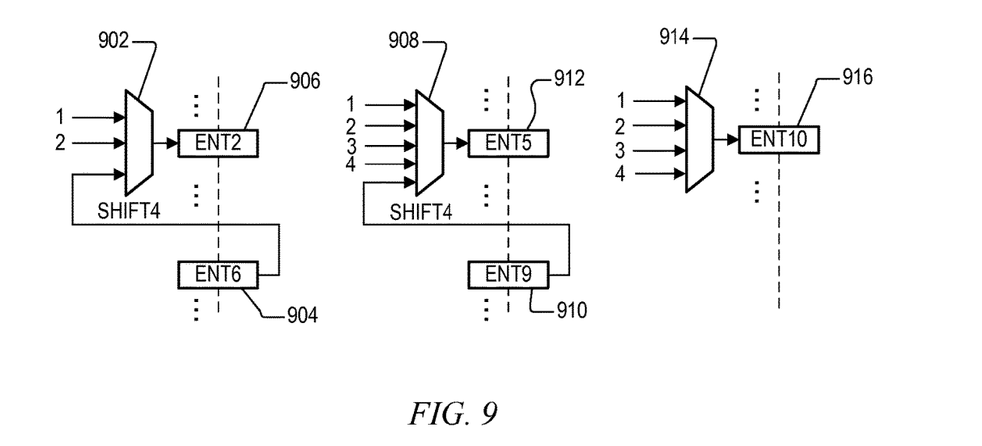
FIG. 9 is a simplified diagram illustrating the shift feature of the RSQ of FIG. 8 according to one embodiment with 12 total entries and assuming that 4 instructions are pushed out at a time.

FIG. 9 is a simplified diagram illustrating the shift feature of the RSQ 802 according to one embodiment with 12 total entries and assuming that 4 instructions are pushed out at a time. As shown by the first diagram on the left, select logic 902 of the RSQ 802 selects between issued instructions 1 and 2 and the instruction at entry 6 904 of the RSQ 802 for the next instruction to be stored at entry 2 906 of the RSQ 802. If entry 1 is full but entry 2 is empty (or being emptied), then instruction 1 is selected. If entries 1 and 2 are empty (or being emptied), then instruction 2 is selected. Otherwise, the instruction at entry 6 904 is selected. Similarly, as shown by the diagram in the middle, for entry 5 912 of the RSQ 802, select logic 908 selects between issued instructions 1-4 and the instruction at entry 9 910 for the next instruction to be stored at entry 5 912 of the RSQ 802. The selected entry depends upon which of the current entries of the RSQ 802 are empty or being emptied. As shown by the diagram on the right, entry 10 916 is handled a little differently when there a total of 12 entries. In this case, select logic 914 selects between issued instructions 1-4 for the next instruction to be stored at entry 10 916 of the RSQ 802. Since 4 entries are pushed for up to 12 entries, there is not shift entry for the entry 10 916.

The foregoing description has been presented to enable one of ordinary skill in the art to make and use the present invention as provided within the context of a particular application and its requirements. Although the present invention has been described in considerable detail with reference to certain preferred versions thereof, other versions and variations are possible and contemplated. Various modifications to the preferred embodiments will be apparent to one skilled in the art, and the general principles defined herein may be applied to other embodiments. For example, the circuits described herein may be implemented in any suitable manner including logic devices or circuitry or the like.

Those skilled in the art should appreciate that they can readily use the disclosed conception and specific embodiments as a basis for designing or modifying other structures for carrying out the same purposes of the present invention without departing from the spirit and scope of the invention. Therefore, the present invention is not intended to be limited to the particular embodiments shown and described herein, but is to be accorded the widest scope consistent with the principles and novel features herein disclosed.

What is claimed is:

1. A microprocessor with a fused reservation stations structure, comprising:
   a primary reservation stations (RS) having an input for receiving issued instructions, having a push output for pushing said issued instructions to a secondary RS regardless of whether or not said issued instructions are ready for dispatch, and having at least one bypass output for dispatching at least one of said issued instructions that is ready for dispatch;
   said secondary RS having an input coupled to said push output of said primary RS and having at least one dispatch output; and
   a bypass system that selects between said bypass output of said primary RS and said at least one dispatch output of said secondary RS for dispatching selected issued instructions, wherein said bypass system selects said bypass output of said primary RS when no instruction stored in said secondary RS is ready to be dispatched and when said primary RS includes at least one issued instructions that is ready for dispatch.

2. The microprocessor of claim 1, wherein said primary RS comprises a unify RS structure.

3. The microprocessor of claim 2, wherein said unify RS structure comprises a single RS queue that can store all of a plurality of instruction types of said issued instructions.

4. The microprocessor of claim 1, wherein said secondary RS comprises a plurality of RS queues.

5. The microprocessor of claim 4, wherein each of said plurality of RS queues stores only one of a plurality of instruction types of said issued instruction.

6. The microprocessor of claim 4, wherein each of said plurality of RS queues comprises multiple outputs.

7. The microprocessor of claim 1, wherein said secondary RS uses odd-even selection for dispatching said issued instructions.

8. The microprocessor of claim 1, wherein said bypass system selects said bypass output of said primary RS when no instruction stored in said secondary RS is ready to be dispatched.

9. The microprocessor of claim 1, wherein said primary RS operates as a spill buffer for receiving and storing additional issued instructions when said secondary RS is full.

10. The microprocessor of claim 9, wherein said primary RS further pushes said additional issued instructions stored in said primary RS to said secondary RS when said secondary RS changes from full to not full.

11. The microprocessor of claim 9, wherein said primary RS is also full and then said secondary RS changes from full to not full, said primary RS further pushes said additional issued instructions stored in said primary RS to said secondary RS before reissued instructions from a reorder buffer (ROB) arrives.

12. The microprocessor of claim 1, wherein said primary RS comprises at least one shift buffer that shifts remaining stored ones of said issued instructions to maintain received instruction order as other ones of said issued instructions are removed from said shift buffer.

13. A microprocessor with a multiple stage reservation stations (RS) structure, comprising:
   a primary RS, comprising:
      at least one primary RS queue for storing received issued instructions;
      a push output for pushing said issued instructions stored in said at least one primary RS queue to a secondary RS regardless of whether or not ready for dispatch; and
      at least one bypass output that can dispatch at least one of said issued instructions stored in said at least one primary RS queue that is ready to be dispatched;
   said secondary RS comprising:
      at least one secondary RS queue for storing said issued instructions received from said primary RS; and
      at least one dispatch output for dispatching up to at least one of said issued instructions stored in said at least one secondary RS queue that is ready to be dispatched; and
   a bypass control system that selects between said dispatch output of said secondary RS and said bypass output of said primary RS for dispatching said issued instructions, wherein said bypass control system selects said bypass output of said primary RS when no instruction stored in said secondary RS is ready to be dispatched and when said primary RS includes at least one issued instruction that is ready for dispatch.

14. The microprocessor of claim 13, wherein said primary RS comprises:
   a single unify RS queue that can store all of a plurality of instruction types of said issued instructions;
   wherein said push output can push up to a predetermined number of said issued instructions in any given clock cycle; and
   wherein said bypass output can dispatch at least one of each of said plurality of instruction types.

15. The microprocessor of claim 13, wherein said secondary RS comprises a plurality of RS queues.

16. The microprocessor of claim 15, wherein each of said plurality of RS queues stores only one of a plurality of instruction types of said issued instructions.

17. The microprocessor of claim 15, wherein each of said plurality of RS queues can output more than one of said stored instructions at a time.

18. The microprocessor of claim 13, wherein said secondary RS uses odd-even selection for dispatching said issued instructions.

19. The microprocessor of claim 13, wherein said bypass control system selects said bypass output of said primary RS when no instruction stored in said secondary RS is ready for dispatch.

20. The microprocessor of claim 13, wherein said bypass control system comprises a plurality of multiplexers, wherein at least one of said plurality of multiplexers selects an issued instruction from said bypass output of said primary RS in a given clock cycle when a corresponding dispatch output of said secondary RS does not dispatch an issued instruction and when said primary RS has a corresponding issued instruction that is ready for dispatch.

21. The microprocessor of claim 13, wherein said primary RS pushes up to a first number of said issued instructions to said secondary RS in a given clock cycle, while said primary RS receives up to a second number of said issued instructions in said given clock cycle, and wherein the first number is more than or equal to the second number.

\* \* \* \* \*